(12) United States Patent
Sakurai et al.

(10) Patent No.: US 9,623,812 B2
(45) Date of Patent: Apr. 18, 2017

(54) VEHICLE CEILING STRUCTURE

(71) Applicant: TOYOTA JIDOSHA KABUSHIKI KAISHA, Toyota-shi, Aichi-ken (JP)

(72) Inventors: Hideyuki Sakurai, Toyota (JP); Akihiro Tamaoki, Tajima (JP); Toru Kondo, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/819,888

(22) Filed: Aug. 6, 2015

(65) Prior Publication Data
US 2016/0052558 A1 Feb. 25, 2016

(30) Foreign Application Priority Data
Aug. 20, 2014 (JP) ................................. 2014-167835

(51) Int. Cl.
*B60R 13/02* (2006.01)
*B60N 3/02* (2006.01)
*B62D 25/06* (2006.01)

(52) U.S. Cl.
CPC ............ *B60R 13/0212* (2013.01); *B60N 3/02* (2013.01); *B60R 13/0206* (2013.01); *B62D 25/06* (2013.01); *B60R 2013/0287* (2013.01); *B60R 2013/0293* (2013.01)

(58) Field of Classification Search
CPC .... B60N 3/02; B60R 13/0212; B60R 13/0225
USPC ................................................ 296/1.02, 214
See application file for complete search history.

(56) References Cited

U.S. PATENT DOCUMENTS

| 5,403,064 A * | 4/1995 | Mahler ...................... B60J 3/02 |
| | | 105/354 |
| 6,079,735 A | 6/2000 | Fallmann et al. |
| 6,227,561 B1 * | 5/2001 | Jost ..................... B60R 13/0212 |
| | | 280/730.2 |
| 2001/0011836 A1 * | 8/2001 | Grey ...................... B60N 2/002 |
| | | 296/214 |
| 2009/0079233 A1 | 3/2009 | Hidaka et al. |
| 2014/0110974 A1 * | 4/2014 | Uchida .................. B60N 3/026 |
| | | 296/214 |

FOREIGN PATENT DOCUMENTS

| EP | 1302370 A2 * | 4/2003 | ......... B60R 13/0225 |
| JP | S58-192172 U | 12/1983 | |
| JP | H07-61304 A | 3/1995 | |

(Continued)

OTHER PUBLICATIONS

English translation of EP 1302370; retreived May 26, 2016 via PatentTranslate located www.epo.org.*

*Primary Examiner* — Jason S Daniels
(74) *Attorney, Agent, or Firm* — Oliff PLC

(57) ABSTRACT

A groove extends in a vehicle longitudinal direction in a roof side garnish positioned on a terminal portion of a ceiling portion. As a result, a curved surface appears to be divided into a curved surface on a center side of the ceiling portion and a curved surface on a terminal portion side of the ceiling portion. Consequently, an illusion in which the ceiling portion appears as though it were divided into the center side and the terminal side of the ceiling portion. As a result, the cabin space appears spacious, so an occupant is able to feel less closed in.

7 Claims, 12 Drawing Sheets

(56) References Cited

FOREIGN PATENT DOCUMENTS

| JP | 2000-507182 A | 6/2000 |
| JP | 2002-510577 A | 4/2002 |
| JP | 2010-195067 A | 9/2010 |
| JP | 2013-014264 A | 1/2013 |
| JP | 5242977 B2 | 7/2013 |
| WO | 99/51466 A1 | 10/1999 |

* cited by examiner

VEHICLE CEILING STRUCTURE

INCORPORATION BY REFERENCE

The disclosure of Japanese Patent Application No. 2014-167835 filed on Aug. 20, 2014 including the specification, drawings and abstract is incorporated herein by reference in its entirety.

BACKGROUND OF THE INVENTION

1. Field of the Invention

The invention relates to a vehicle ceiling structure.

2. Description of Related Art

The amount of the cabin space in a compact car is limited by the external size of the car, so it is desirable to make the cabin space feel not so closed in. Japanese Patent Application Publication No. 2013-014264 (JP 2013-014264 A), for example, describes technology that makes the cabin space feel more spacious in perspective from the inside toward the outside in the vehicle width direction, by changing the dimensions in the vehicle width direction and the vertical direction of a design surface of an instrument panel, and changing the size of the grains (i.e., embossing) formed on the design surface.

SUMMARY OF THE INVENTION

One way to obtain a more spacious feeling in the cabin is to widen the ceiling surface in the cabin toward the cabin outside (i.e., upward in the vehicle vertical direction and outward in the vehicle width direction). This may make the cabin space feel less closed in.

However, in addition to curtain airbags and wire harnesses and the like being provided on the reverse side (outside the cabin) of a roof headlining, it is not easy to expand the ceiling surface in the cabin toward the vehicle cabin outside. Also, parts such as assist grips are also arranged on the ceiling surface inside the cabin, and these parts may also give an occupant a closed-in feeling.

The invention thus provides a vehicle ceiling structure capable of making an occupant feel less closed-in by making the space inside the cabin appear more spacious.

A first aspect of the invention relates to a ceiling structure for a vehicle. This ceiling structure includes a ceiling portion and a groove. The ceiling portion forms a ceiling surface of a cabin space of the vehicle. The ceiling portion is formed such that a terminal side is lower in a vehicle vertical direction than a center side. The groove is provided in a vehicle longitudinal direction on at least the terminal side on an outside of the ceiling portion in a vehicle width direction. The groove is recessed upward in the vehicle vertical direction and outward in a horizontal direction.

A ceiling portion is formed with a curved surface that is continuous from the center side to the terminal side. In contrast, in the invention, a groove is formed on the terminal side of the ceiling portion, so the curved surface appears as though it were divided into the center side and the terminal side of the ceiling portion. As a result, an illusion (an optical effect) in which the ceiling portion appears to an occupant to be formed by two portions is able to be created. By creating an illusion in which there appears to be yet another ceiling portion to the outside of the inside edge portion of the groove positioned on the center side of the ceiling portion, the ceiling portion appears to extend out by a corresponding amount to the outside in the horizontal direction (i.e., to the outside in the vehicle width direction).

The vehicle ceiling structure according to the above aspect has a beneficial effect in which the space inside the cabin appears spacious, so an occupant is able to feel less closed in.

In the aspect described above, the groove may include an upper wall portion. This upper wall portion may be positioned on an upper side of the groove in the vehicle vertical direction. Also, the upper wall portion may be provided in the cabin space of the vehicle so as to be hidden from view of a seated occupant seated on a seat.

In the structure described above, the upper wall portion of the groove is set so as to be hidden from view of a seated occupant seated on a seat. Therefore, the curved surface appears to be completely divided into the center side of the ceiling portion and the terminal side of the ceiling portion, with the groove in between.

The vehicle ceiling structure according to the above structure has a beneficial effect in which an illusion in which the ceiling portion is formed by two portions is able to be created.

In the structures described above, the groove may include a far wall portion. This far wall portion may be positioned on the terminal side of the ceiling portion. Also, the far wall portion may be provided in the cabin space of the vehicle so as to be visibly recognizable by a seated occupant seated on a seat.

In this structure, the far wall portion of the groove is set so as to be visibly recognizable by the seated occupant seated on the seat. Therefore, the curved surface appears to be divided into the center side of the ceiling portion and the terminal side of the ceiling portion, with the groove in between, and another wall (the far wall portion) is visibly recognizable on the terminal side of the ceiling portion.

The vehicle ceiling structure according to the above structure has a beneficial effect in which an illusion in which the cabin space seems spacious to a seated occupant is able to be effectively created.

In the structures described above, a protruding portion may be provided on an inside edge portion of the groove that is positioned on the center side of the ceiling portion. The protruding portion may protrude downward in the vehicle vertical direction.

In this structure, a protruding portion that protrudes downward in the vehicle vertical direction is formed on the inside edge portion of the groove that is positioned on the center side of the ceiling portion. Therefore, the inside of the groove becomes is shadowed by the protruding portion, so the color of the inside of the groove is darker than a general portion of the ceiling portion. As a result, the curved surface appears to be divided into the center side of the ceiling portion and the terminal side of the ceiling portion, with the groove in between.

The vehicle ceiling structure according to claim 4 has a beneficial effect in which an illusion in which the ceiling portion seems to be formed by two portions is able to be effectively created.

In the structure described above, an apex portion of the protruding portion may be arranged higher than a terminal portion of the ceiling portion in the vehicle vertical direction.

In this structure, the apex portion of the protruding portion is arranged higher than the terminal portion of the ceiling portion in the vehicle vertical direction. Therefore, the far wall portion of the groove is visually recognizable to the seated occupant. As a result, the curved surface appears to be divided into the center side of the ceiling portion and the terminal side of the ceiling portion, with the groove in between, and another wall (the far wall portion) is visibly recognizable on the terminal side of the ceiling portion.

The vehicle ceiling structure according to the above structure has a beneficial effect in which an illusion in which the cabin space seems spacious to the seated occupant is able to be effectively created.

In the structures described above, an interior member provided on the terminal side of the ceiling portion may be housed inside of the groove.

In this structure, an interior member is housed in the groove. Therefore, the closed-in feeling due to the interior member being provided on the ceiling portion is able to be alleviated.

The vehicle ceiling structure according to the above structure has a beneficial effect in which the appearance of the ceiling surface is improved compared to when an interior member is exposed on the cabin space side.

In the structure described above, the interior member may be an assist grip for hooking a finger of a seated occupant seated on a seat onto.

In this structure, an assist grip for hooking a finger of a seated occupant onto is housed in the groove. Accordingly, the assist grip is not exposed on the cabin space side. Therefore, the closed-in feeling is able to be reduced compared to when a plurality of assist grips are exposed on the cabin space side.

The vehicle ceiling structure according to the above structure has a beneficial effect in which the appearance of the ceiling surface is improved compared to when a plurality of assist grips inside the cabin are exposed on the cabin space side.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
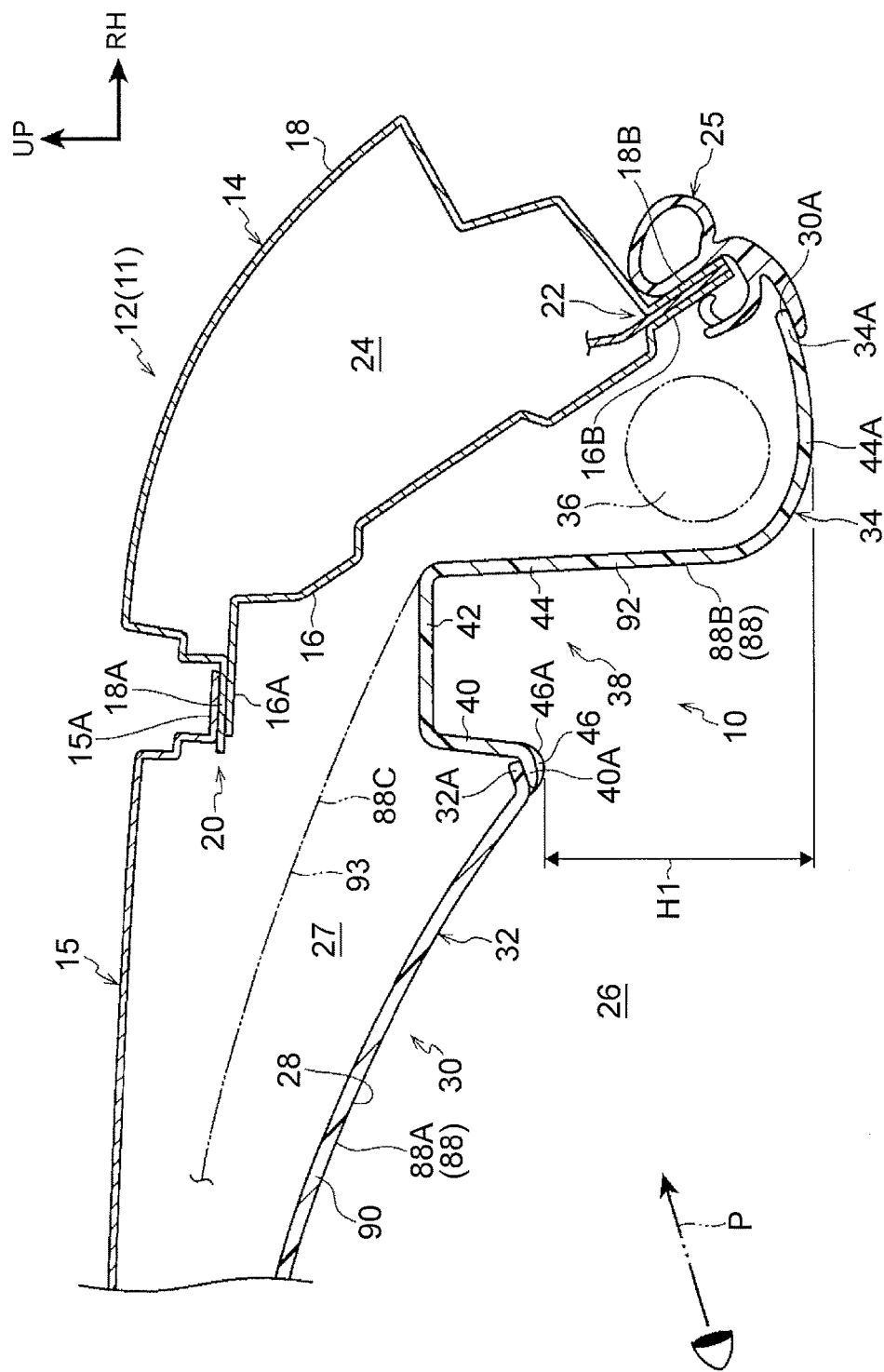
FIG. 1 is a longitudinal sectional view of a vehicle ceiling structure according to an example embodiment of the invention cut along the vehicle width direction.

Hereinafter, a vehicle ceiling structure according to one example embodiment of the invention will be described with reference to the accompanying drawings. In the drawings, arrow FR indicates a forward direction of a vehicle to which the vehicle ceiling structure 10 according to the example embodiment of the invention is applied, arrow UP indicates an upward direction with respect to the vehicle, arrow RH indicates a direction to the right of the vehicle, and arrow LH indicates a direction to the left of the vehicle. Hereinafter, unless otherwise specified, when directions of front and rear (longitudinal), up and down (vertical), and left and right (lateral) are used, they will refer to front and rear in a vehicle longitudinal direction, up and down in a vehicle vertical direction, and left and right when the vehicle is facing forward, respectively.

FIG. 1 is a sectional view of the vehicle ceiling structure 10 according to this example embodiment cut along the vehicle width direction. As shown in FIG. 1, a pair of roof side rails 14 that are frame members of a vehicle 11 are provided one on each side in the vehicle width direction of a vehicle upper portion 12. Only the right side of the vehicle 11 is shown here. Each roof side rail 14 is made of steel sheet, for example, and extends in the vehicle longitudinal direction. Also, each roof side rail 14 includes an inner panel 16 arranged on the inside in the vehicle width direction, and an outer panel 18 arranged on the outside in the vehicle width direction of the inner panel 16.

Flange portions 16A and 16B are formed one on each end portion of the inner panel 16 in the vehicle width direction, and flange portions 18A and 18B are formed one on each end portion of the outer panel 18 in the vehicle width direction. The flange portions 16A and 16B of the inner panel 16 are joined to the flange portions 18A and 18B of the outer panel 18, respectively, such that a closed sectional portion 24 is formed between the inner panel 16 and the outer panel 18.

Further, a roof panel 15 that covers a cabin space (the space inside the cabin) 26 is provided on the vehicle upper portion 12, and a flange portion 15A is provided on both end portions of the roof panel 15 in the vehicle width direction. This flange portion 15A is joined to a flange portion 18A of the outer panel 18 at a joining portion 20 that is positioned on the inside of the roof side rail 14 in the vehicle width direction.

An opening trim 25 is attached to a joining portion 22 that is positioned on the outside of the roof side rail 14 in the vehicle width direction, along the extending direction of the joining portion 22. With a sashless type window structure, water-tightness and air-tightness are able to be obtained by having an upper edge of a side window, not show, contact the opening trim 25.

Here, with the vehicle ceiling structure 10 according to this example embodiment, a ceiling portion 30 that forms a ceiling surface 28 of the cabin space (the space inside the cabin) 26 includes a molded ceiling (a so-called roof headlining) 32, and a roof side garnish 34 that extends in the vehicle longitudinal direction on both sides of the molded ceiling 32 in the vehicle width direction.

Typically, the roof side garnish 34 is arranged between the molded ceiling 32 and the roof side rail 14, and is a member that is provided as an interior member in a region to the outside of an outer edge portion 32A of the molded ceiling 32 in the vehicle width direction. However, in this example embodiment, the roof side garnish 34 is formed as part of the ceiling portion 30.

Therefore, in this example embodiment, a terminal side of the ceiling portion 30 refers to the roof side garnish 34. The molded ceiling 32 and the roof side garnish 34 are formed covering a cabin side surface of a substructure made of synthetic resin, for example, with a cover, not shown, and these appear integrated.

The molded ceiling 32 is a gently curved surface that protrudes upward in the vehicle width direction, and is formed such that the ratio of the dimension in the vehicle vertical direction to the dimension in the vehicle width direction is larger on the outer edge portion 32A side than on the center side of the molded ceiling 32. Moreover, a far wall portion 44, described later, of the roof side garnish 34 is formed upright in the vehicle vertical direction, so the ratio of the dimension in the vehicle vertical direction to the dimension in the vehicle width direction at this far wall portion 44 is even greater than it is on the outer edge portion 32A side of the molded ceiling 32.

An airbag (so-called curtain airbag) 36 is provided between the roof side garnish 34 and the inner panel 16 of the roof side rail 14. The airbag 36 is provided in a folded state along the roof side rail 14, and is configured to be able to deploy in a curtain shape toward the cabin space 26 when supplied with inflation gas.

Here, in this example embodiment, a groove 38 is formed in the vehicle longitudinal direction in each of the two roof side garnishes 34. The groove 38 is formed recessed upward in the vehicle vertical direction and outward in the vehicle width direction (horizontal direction). The sectional shape of the groove 38 when the groove 38 is cut in the vehicle width direction is a general U-shape that is open on the lower side (i.e., an inverted U-shape).

The groove 38 has a vertical wall portion 40 that is arranged on the inside in the vehicle width direction and is capable of retaining the outer edge portion 32A of the molded ceiling 32, an upper wall portion 42 that protrudes toward the outside in the vehicle width direction from an upper end portion of the vertical wall portion 40, and a far wall portion 44 that extends downward from an outer end portion of the upper wall portion 42 and faces the vertical wall portion 40.

A protruding portion 46 that protrudes downward in the vehicle vertical direction is formed on a lower end portion 40A of the vertical wall portion 40 (i.e., on an inside edge portion of the groove 38). This protruding portion 46 is formed continuous with the shape of the outer edge portion 32A of the molded ceiling 32 in the vehicle width direction, and is substantially flush with the lower end portion 40A of the vertical wall portion 40 of the groove 38 and the outer edge portion 32A of the molded ceiling 32 in the vehicle width direction, when the outer edge portion 32A of the molded ceiling 32 is engaged with the lower end portion 40A of the vertical wall portion 40.

The upper wall portion 42 is arranged higher than the outer edge portion 32A of the molded ceiling 32. This upper wall portion 42 is set so to be hidden from sight by the vertical wall portion 40 when viewed (chain double-dashed line P) by a seated occupant (hereinafter, simply referred to as "occupant") of average build who is seated in a seat, not shown. Also, a lower end portion 44A of the far wall portion 44 is arranged lower than (dimension H1) an apex portion 46A of the protruding portion 46 positioned on the lower end portion 40A of the vertical wall portion 40. That is, at least a lower portion of the far wall portion 44 is exposed to the cabin space 26 side (i.e., is visibly recognizable from the cabin space 26 side).

Figure 2:
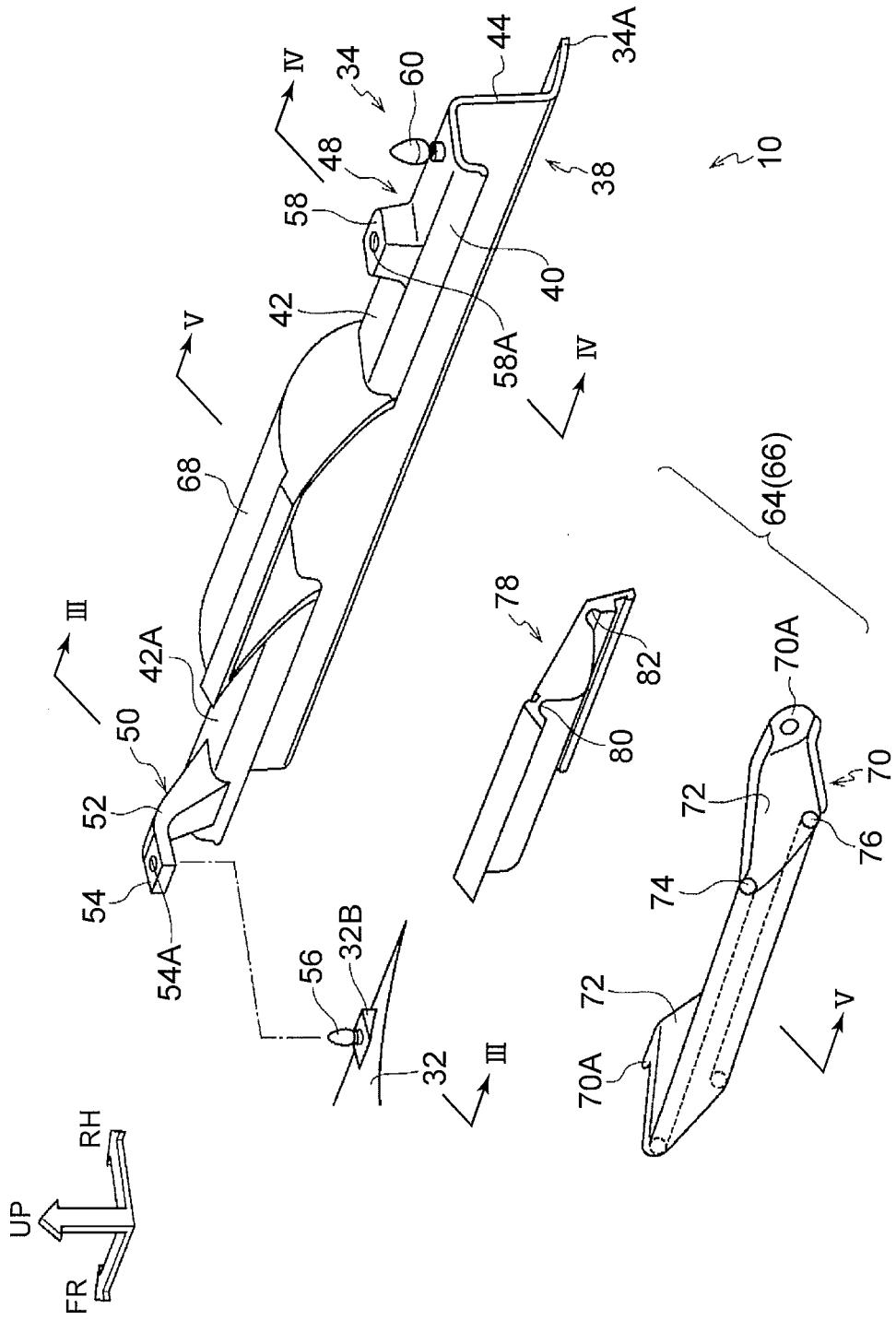
FIG. 2 is an exploded perspective view of one example of the vehicle ceiling structure according to the example embodiment.

FIG. 2 is an exploded perspective view of a portion of the vehicle ceiling structure 10 that includes an assist grip 64 that will be described later. A plurality of body fixing seats 48 that are fixed to the roof side rail 14 side, and ceiling fixing seats 50 for fixing the molded ceiling 32, are provided on the upper wall portion 42, as shown in FIG. 2. In the described below, portions provided in plurality, such as the body fixing seats 48 and the ceiling fixing seats 50, may be described in the singular to simplify the description and facilitate understanding. Although not shown, an integral hinge is provided on the far wall portion 44. This integral hinge is designed to break when the airbag 36 (see FIG. 1) deploys, so as not to impede deployment of the airbag 36.

Figure 3:
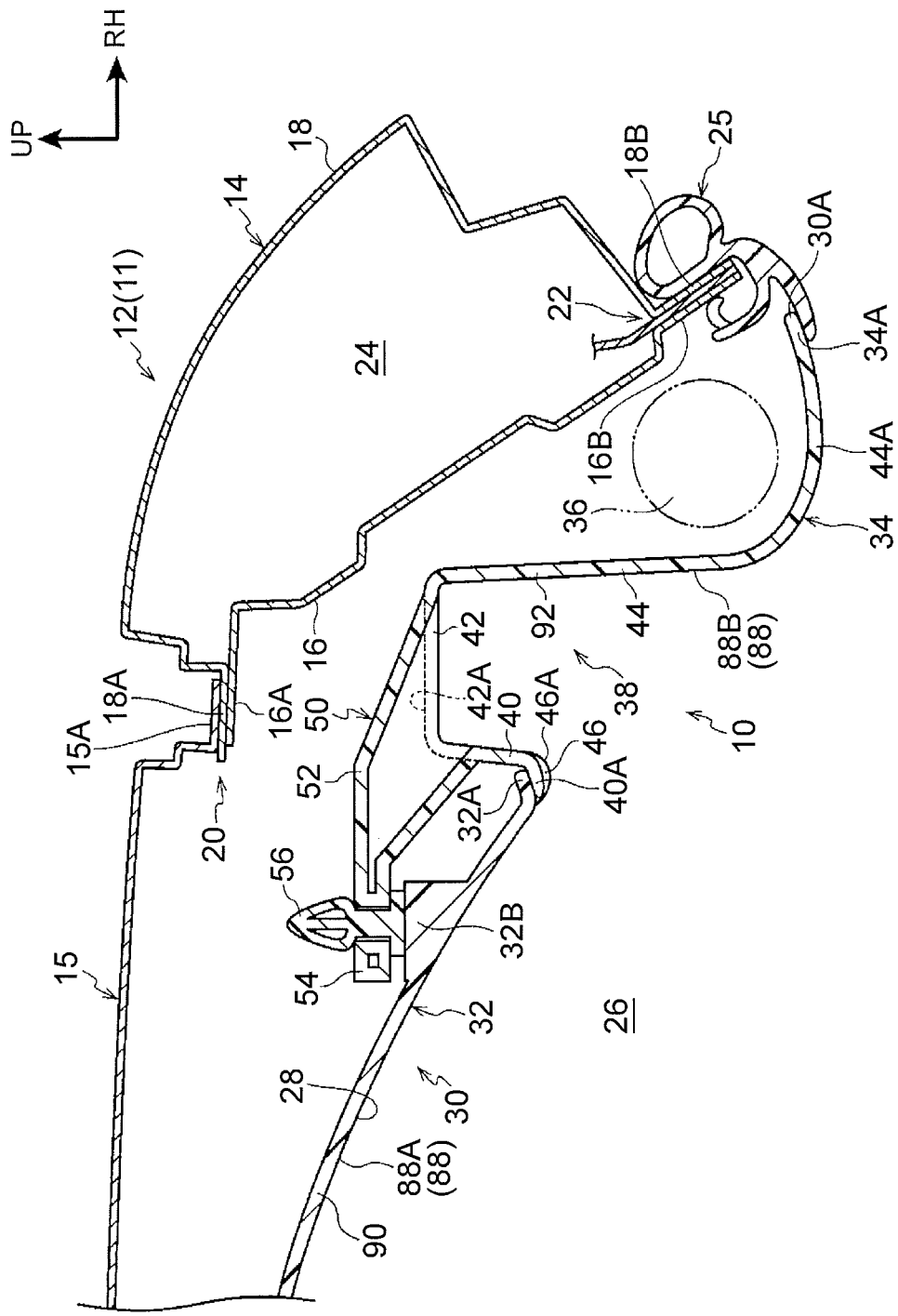
FIG. 3 is a sectional view take along line III-III in FIG. 2 when the parts are assembled.

FIG. 3 is a sectional view take along line III-III in FIG. 2 when the parts are assembled. As shown in FIGS. 2 and 3, a generally angular tube-shaped mount 52 that protrudes upward and to the inside in the vehicle width direction from an upper surface 42A of the upper wall portion 42 is provided on the ceiling fixing seat 50. A plate-shaped seat portion 54 protrudes from the upper end portion of the mount 52 toward the inside in the vehicle width direction, and a hole 54A through which a clip 56 is able to be inserted is formed in the center portion of this seat portion 54.

Here, a clip seat 32B is provided in the vertical direction on the back surface side (the cabin outside) of the molded ceiling 32. The clip 56 is provided in the vertical direction on the clip seat 32B. The clip 56 is held to the seat portion 54 of the ceiling fixing seat 50 by being inserted into the hole 54A and engaged with the inside edge portion of the hole 54A. As a result, the molded ceiling 32 is fixed to the roof side garnish 34 via this clip 56.

Figure 4:
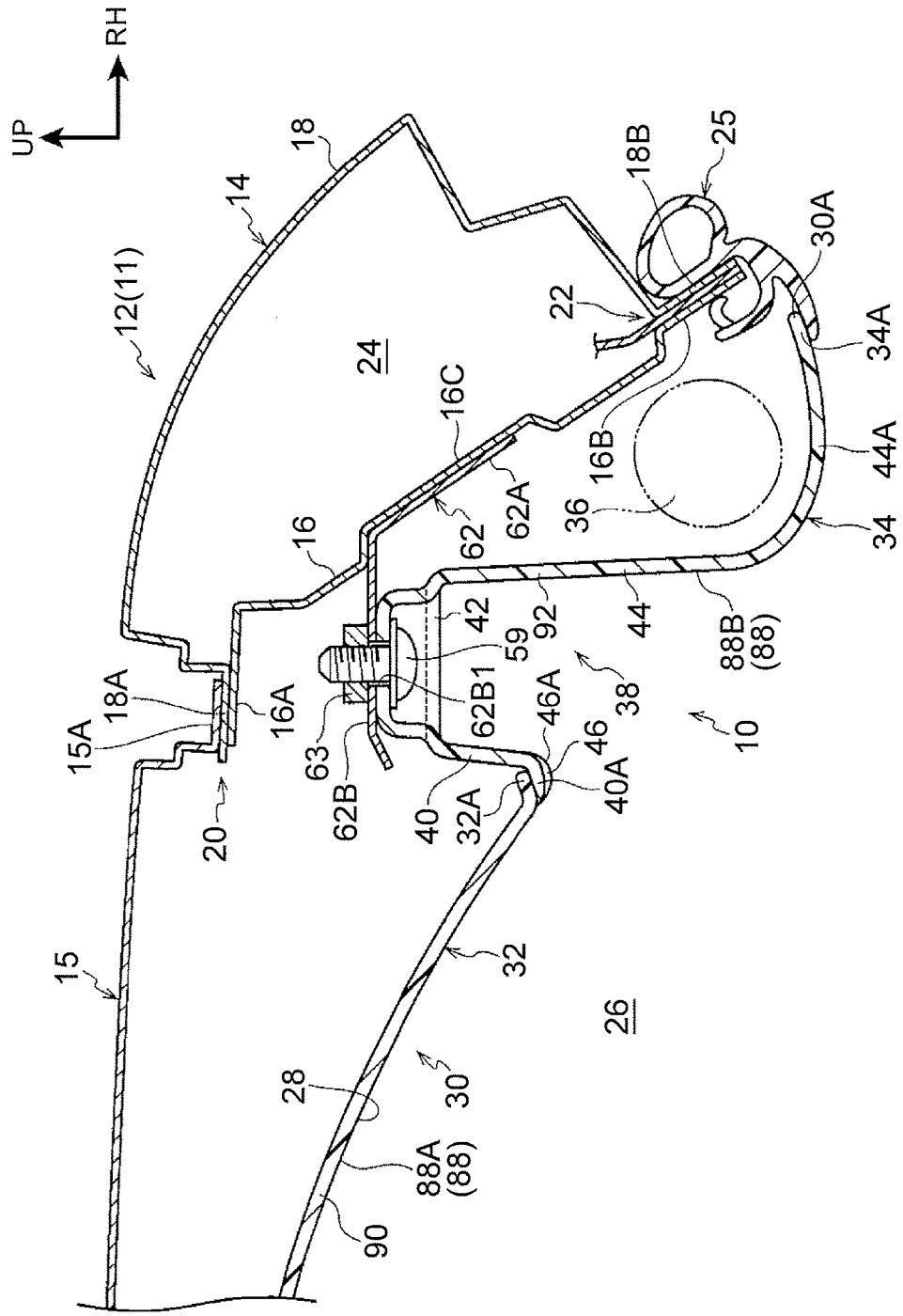
FIG. 4 is a sectional view take along line IV-IV in FIG. 2 when the parts are assembled.

Meanwhile, as shown in FIG. 2, a generally circular cylindrical mount 58 that protrudes upward from the upper surface 42A of the upper wall portion 42 is provided on the body fixing seat 48, and a hole 58A into which a screw 59 (see FIG. 4) is able to be inserted is formed in an upper end portion of this mount 58. Also, a clip 60 is provided in the vertical direction on the body fixing seat 48. FIG. 4 is a sectional view take along line IV-IV in FIG. 2 when the parts are assembled.

Here, as shown in FIG. 4, a plate-shaped bracket 62 is welded to a general surface 16C of the inner panel 16 of the roof side rail 14. The bracket 62 has a generally inverted L-shaped cross-section along the vehicle width direction, and one end portion 62A of the bracket 62 is welded to the general surface 16C of the inner panel 16. Also, the other end portion 62B of the bracket 62 is arranged protruding toward the inside in the vehicle width direction. A hole, not shown, into which the clip 60 is able to be inserted, and a hole 62B1 into which the screw 59 is able to be inserted, are each formed in the other end portion 62B of the bracket 62.

With the clip 60 inserted into the hole in the bracket 62 and held to the inside edge portion of this hole, not shown, the screw 59 is then able to be fastened to the bracket 62 via a weld nut 63 shown in FIG. 4. Having the screw 59 fastened to the bracket 62 in this way results in the roof side garnish 34 being fixed to the roof side rail 14, and the molded ceiling 32 being fixed to the roof side rail 14 via the roof side garnish 34.

Figure 6:
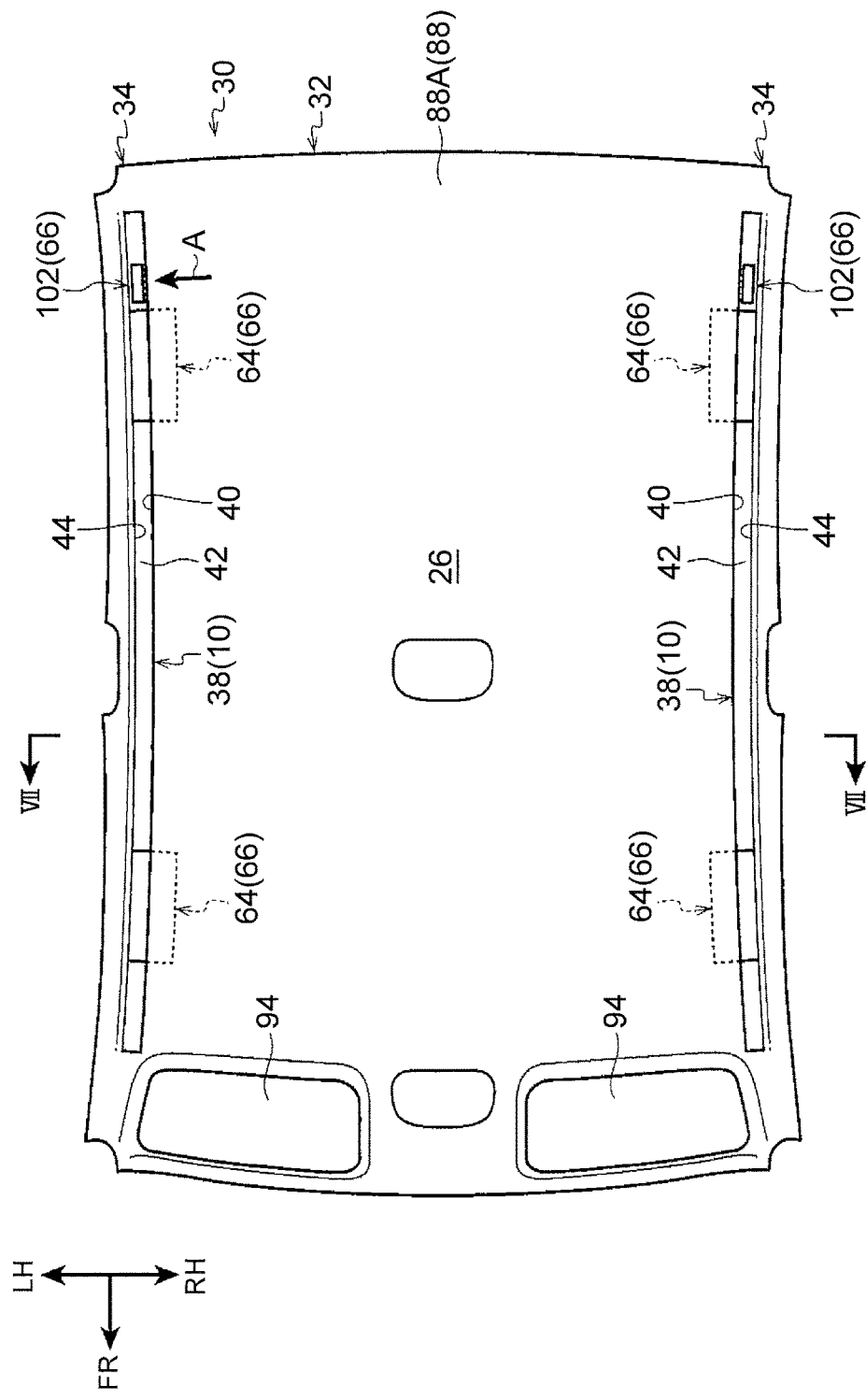
FIG. 6 is a bottom view of the vehicle ceiling structure according to the example embodiment as viewed from below.

FIG. 6 is a bottom view of the vehicle ceiling structure 10 as viewed from below. As shown in FIGS. 2 and 6, an assist grip 64 that an occupant holds onto is able to be attached in a predetermined position in the vehicle longitudinal direction of the roof side garnish 34, or more specifically, above a seat, not shown. In this example embodiment, the groove 38 is formed in the roof side garnish 34, so the assist grip 64 is provided inside this groove 38, as one interior member 66.

For example, in the region where the assist grip 64 is provided, a far wall portion 68 of the groove 38 extends farther upward than the far wall portion 44. A reinforcing bracket 70 of which a length direction is in the vehicle longitudinal direction is fixed to the far wall portion 68.

More specifically, axial plates 72 arranged in a width direction orthogonal to the length direction are provided on one on each end portion of the reinforcing bracket 70 in the length direction. Fixing flanges 70A protrude in directions away from each other from outer edge portions positioned on the outsides in the vehicle width direction (the plate thickness direction) of these axial plates. The reinforcing bracket 70 is fixed to the far wall portion 68 via these fixing flanges 70A. Here, the reinforcing bracket 70 is made of synthetic resin, for example, but it may also be made of metal.

Also, two shafts 74 and 76 are provided one above the other along a curved surface 88 of the molded ceiling 32 in the vehicle longitudinal direction. Meanwhile, a plate-shaped finger striking portion 78 made of resin is arranged to the outside of the reinforcing bracket 70 in the vehicle width direction. Engaging portions 80 and 82 that engage with the shafts 74 and 76 are formed on the finger striking portion 78. The finger striking portion 78 attaches to the reinforcing bracket 70 by engaging these engaging portions 80 and 82 with the shafts 74 and 76.

Figure 5:
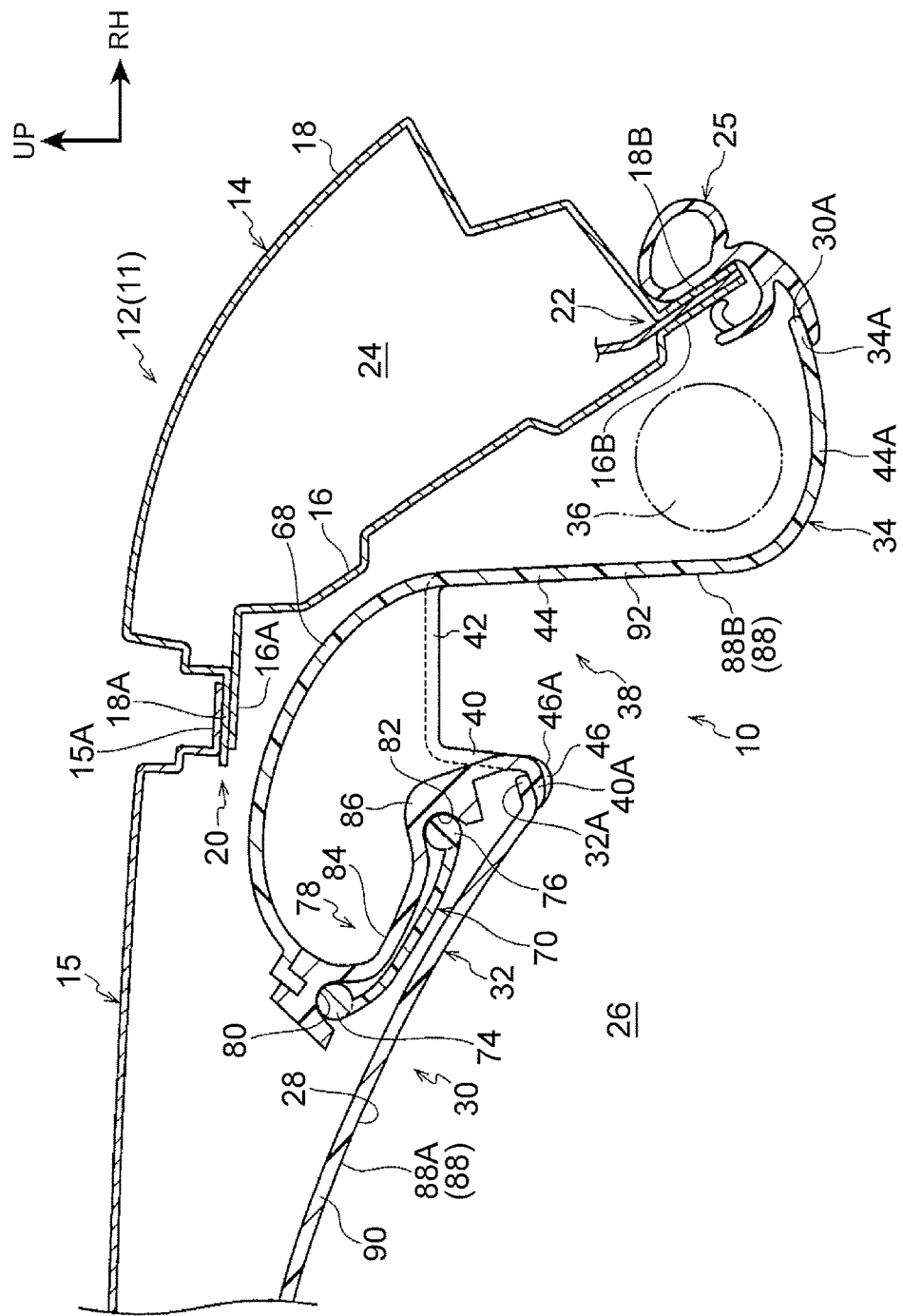
FIG. 5 is a sectional view take along line V-V in FIG. 2 when the parts are assembled.

FIG. 5 is a sectional view take along line V-V in FIG. 2 when the parts are assembled. As shown in FIG. 5, a finger striking surface 84 is formed recessed toward the inside in the vehicle width direction, on the finger striking portion 78. A protruding portion 86 that protrudes upward is provided on a lower portion of the finger striking portion 78. When fingers of the occupant strike the finger striking surface 84, they catch on this protruding portion 86. Cushion material or the like may be adhered to the surface of the finger striking portion 78.

Figure 7:
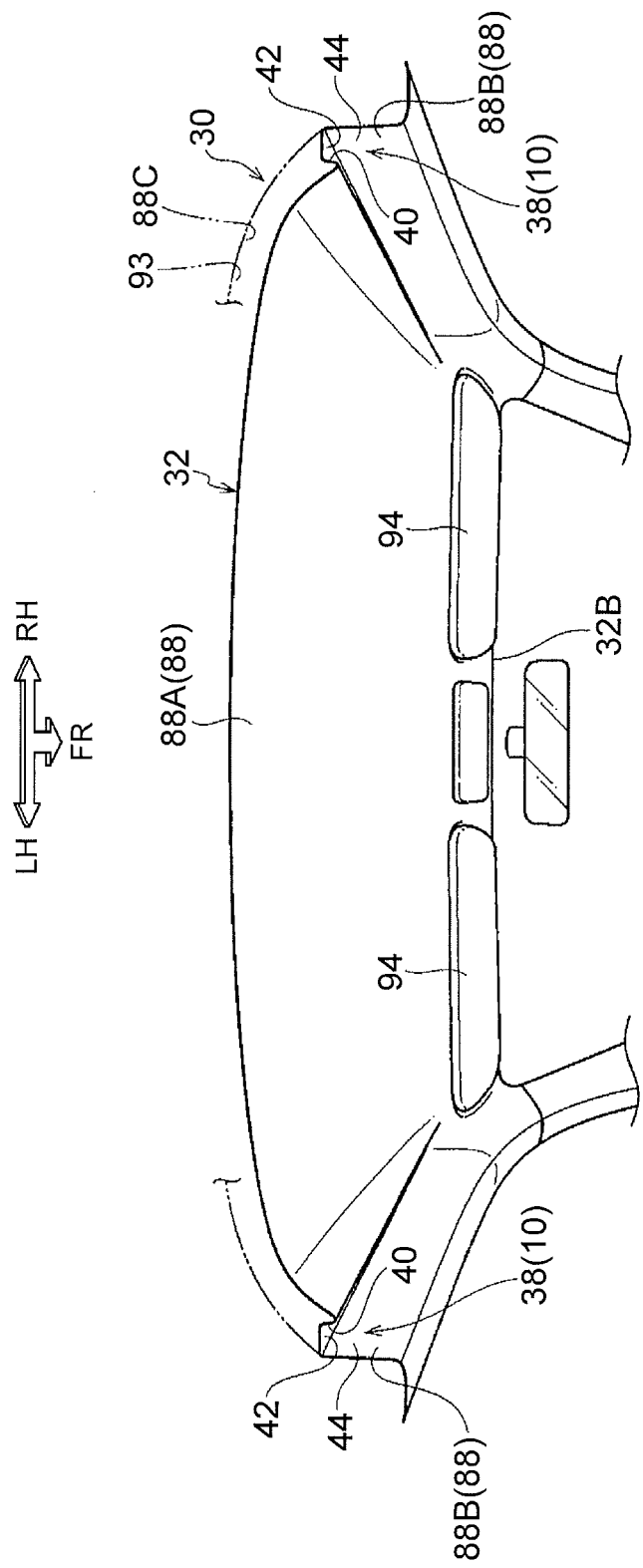
FIG. 7 is a schematic sectional view taken along line VII-VII in FIG. 6.

FIG. 7 is a schematic sectional view taken along line VII-VII in FIG. 6. As shown in FIGS. 1 and 7, in this example embodiment, the groove 38 extends in the vehicle longitudinal direction in the roof side garnish 34 positioned on a terminal portion 30A of the ceiling portion 30. Typically, the curved surface the ceiling portion 30 is formed continuous from the center side to the terminal portion 30A side. In contrast, in this example embodiment, the groove 38 is formed in the roof side garnish 34 that is positioned on the terminal portion 30A side of the ceiling portion 30, so the curved surface 88 appears as though it is divided into a curved surface 88A on the center side of the ceiling portion 30, and a curved surface 88B on the terminal portion 30A side of the ceiling portion 30.

In particular, the portion where the groove 38 is formed is darkened (shadowed), and thus ends up being darker than the other portion of the ceiling portion 30 (i.e., a general portion that is a ceiling portion 90) due to the groove 38 being formed in the roof side garnish 34. Also, the upper wall portion 42 of the groove 38 is set so as to be out of the line of sight (chain double-dashed line P) of the occupant, so the far wall portion 44 is able to be visually recognized at the back of the groove 38.

Therefore, when the curved surface 88 appears to be divided into the curved surface 88A on the center side of the ceiling portion 30, and the curved surface 88B on the terminal portion 30A side of the ceiling portion 30, an illusion in which the ceiling portion 30 appears to be formed by two parts (i.e., a ceiling portion 90 and a ceiling portion 92) is able to be created.

By creating the illusion in which the ceiling portion 90 exists farther to the outside than the lower end portion 40A of the vertical wall portion 40 (the inside edge portion of the groove 38) in this way, the ceiling portion 30 appears to extend out by a corresponding amount toward the outside in the vehicle width direction (toward the outside in the horizontal direction), particularly to an occupant in a rear seat. As a result, the cabin space 26 appears more spacious, so the occupant is able to feel less closed-in. Naturally, an occupant in a front seat will also feel less closed-in.

Further, the roof side garnish 34 positioned on the terminal portion 30A side of the ceiling portion 30 is formed so as to be lower in the vehicle vertical direction than the molded ceiling 32 that is positioned on the center side of the ceiling portion 30. Also, the ratio of the dimension in the vehicle vertical direction to the dimension in the vehicle width direction is made to be greater on the outer edge portion 32A side that it is on the center side of the molded ceiling 32. Moreover, the far wall portion 44 of the roof side garnish 34 is formed upright in the vehicle vertical direction, so the ratio of the dimension in the vehicle vertical direction to the dimension in the vehicle width direction at the far wall portion 44 is even larger than it is on the outer edge portion 32A side of the molded ceiling 32.

By forming the far wall portion 44 of the roof side garnish 34 upright in the vehicle vertical direction in this way, the curvature of the molded ceiling 32 appears even smaller than it actually is, thereby giving off the illusion that a flat surface is formed on the ceiling surface 28, and making the cabin space 26 appear even more spacious.

Also, by forming the groove 38 in the ceiling portion 30, the height of the lower end portion 40A of the vertical wall portion 40 (the inside edge portion of the groove 38) is higher (dimension H1) than the height of the terminal portion 30A of the ceiling portion 30 when the groove 38 is not formed. As a result, the ceiling surface 28 appears even more like a flat surface, and an illusion in which the ceiling portion 30 to the inside of the groove 38 appears to be higher position than when the groove 38 is not provided is created, thus giving the occupant the feeling that the space above his or her head is even roomier than it actually is.

Moreover, by forming the groove 38 in the ceiling portion 30, the ceiling portion 30 appears to the occupant to be a double structure (the ceiling portion 90 and the ceiling portion 92) formed with two portions, and an effect is achieved in which the occupant is made to feel as though there is yet another ceiling portion 93 above the general surface (curved surface 88A) of the ceiling portion 30 that is seen by the occupant, and consequently, that there is an interior space 27 above the actual cabin space 26 by a virtual curved surface 88C that is continuous with the curved surface 88B. As a result, the occupant is able to feel that the space above his or her head is roomier than it actually is.

Also, in this example embodiment, the protruding portion 46 that protrudes downward is formed on the lower end portion 40A of the vertical wall portion 40 (i.e., on the inside edge portion of the groove 38). The inside of the groove 38 is shadowed by the protruding portion 46, and the color of the inside of the groove 38 is darker than that of the general portion (i.e., the ceiling portion 90) of the ceiling portion 30. As a result, an illusion in which the ceiling portion 30 is formed of two portions (i.e., the ceiling portion 90 and the ceiling portion 92) is able to be created. The inside of the groove 38 may also be darkened by making the color of the upper wall portion 42 of the groove 38 darker.

Although not shown, a plurality of assist grips are typically arranged exposed to the cabin space 26 side, so the occupant may feel closed-in by these assist grips. However, in this example embodiment, the assist grips 64 are housed inside the grooves 38 formed in the roof side garnishes 34, as shown in FIGS. 2 and 5.

By having the assist grips 64 be able to be housed in the grooves 38 in this way, the assist grips 64 are able to not be exposed to the cabin space 26 side regardless of whether they are used. Therefore, the closed-in feeling due to the assist grips 64 being provided in the ceiling portion 30 is able to be alleviated. Also, by having the assist grips 64 housed inside the grooves 38, the aesthetics of the ceiling portion 30 are able to be improved compared to when the assist grips 64 are exposed on the cabin space 26 side.

Also, by having the assist grips 64 be able to be housed inside the grooves 38, the length of the assist grips 64 in the length direction is able to be made longer than that of typical assist grips. As a result, the position where the fingers strike the finger striking portion 78 is able to be changed to match each individual occupant. That is, the degree of freedom in the position where the fingers strike increases.

In the example embodiment, the ceiling portion 30 includes the molded ceiling 32 and the roof side garnish 34, but the roof side garnish 34 is not always necessary. In this case, the groove 38 may be formed on the molded ceiling 32.

Also, in the example embodiment, the groove 38 is formed in the extending direction of the roof side garnish 34 that forms a portion of the ceiling portion 30, as a terminal side of the ceiling portion 30, as shown in FIG. 7. That is, the groove 38 is formed in the vehicle longitudinal direction to the outside of the ceiling portion 30 in the vehicle width direction. In addition to this, a groove 98 (see FIG. 8) may also be formed in the vehicle width direction on a front portion of the ceiling portion 30, as a terminal side of the ceiling portion 30.

Figure 8:
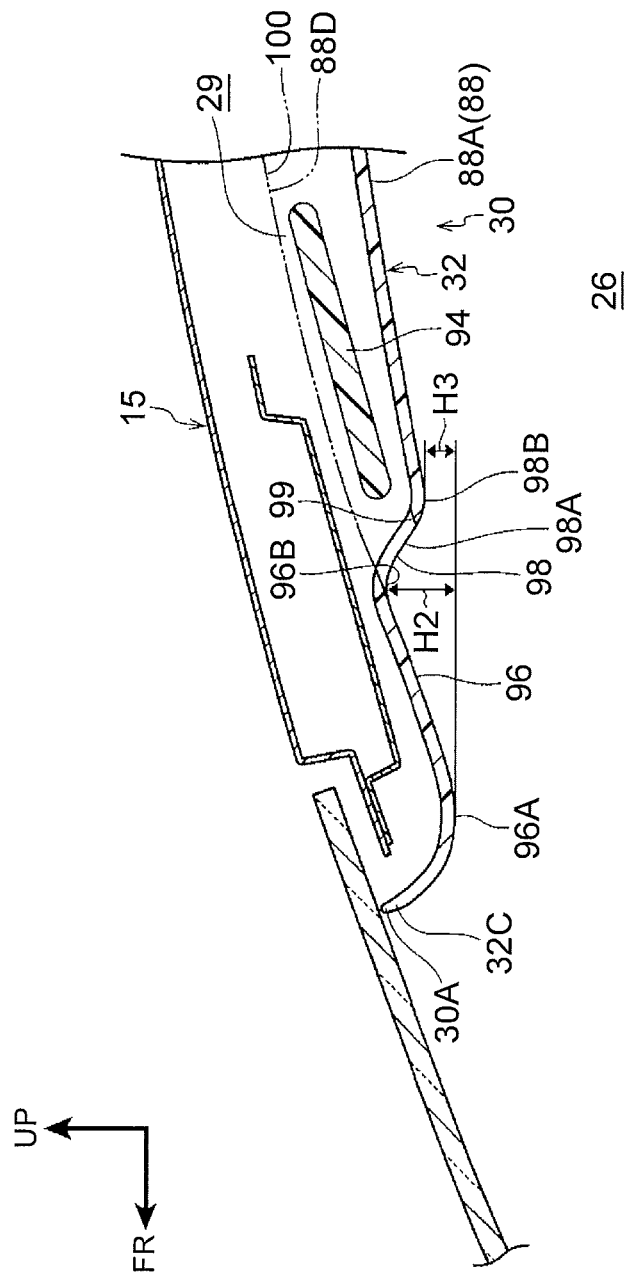
FIG. 8 is a sectional view of a modified example (2) of the vehicle ceiling structure according to the example embodiment cut along the vehicle width direction.

For example, FIG. 8 is a sectional view of a front portion (i.e., a front end portion 32C of the molded ceiling 32) side of the ceiling portion 30 that includes a side visor 94, cut in the vehicle longitudinal direction. As shown in FIG. 8, when the side visor 94 is housed inside the molded ceiling 32, an inclined surface 96 that inclines upward toward the rear from the front end portion 32C of the molded ceiling 32 is formed. This inclined surface 96 is able to face the side visor 94 when the side visor 94 is exposed to the cabin space 26 side when being used.

Because the side visor 94 is housed to the rear of the inclined surface 96, the molded ceiling 32 protrudes downward by a corresponding amount. Therefore, the groove 98 is formed using a step (H2) between a front end portion 96A of the inclined surface 96 and a rear end portion 96B of the inclined surface 96. An opening 99 is formed in a rear wall portion 98A of the groove 98, and the side visor 94 is able to be taken out and put away through this opening 99. Also, the rear wall portion 98A of the groove 98 is out of the like of sight of the occupant. Moreover, a drop (H3) is provided between a rear edge portion 98B of the groove 98 and the front end portion 96A of the inclined surface 96.

Forming the groove 98 on the front end portion 32C side of the molded ceiling 32 in this way makes it possible to give the illusion that there is a ceiling portion 100 to the rear of the groove 98 (above the ceiling portion 30). That is, an effect is achieved in which the occupant is made to feel as though there is yet another ceiling portion 100 above the general surface (curved surface 88A) of the ceiling portion 30 that is seen by the occupant, and consequently, that there is an interior space 29 above the actual cabin space 26 by a virtual curved surface 88D that is continuous with the inclined surface 96. As a result, the occupant is able to feel that the space above his or her head is roomier than it actually is. Thus, the occupant is able to feel not as closed in.

In addition to this, in the example embodiment, an example is described in which the assist grip 64 as an example of the interior member 66 is housed inside the groove 38, as shown in FIG. 6, but the configuration is not limited to this because all that is required is that the interior member 66 be housed inside the groove 38.

Figure 9:
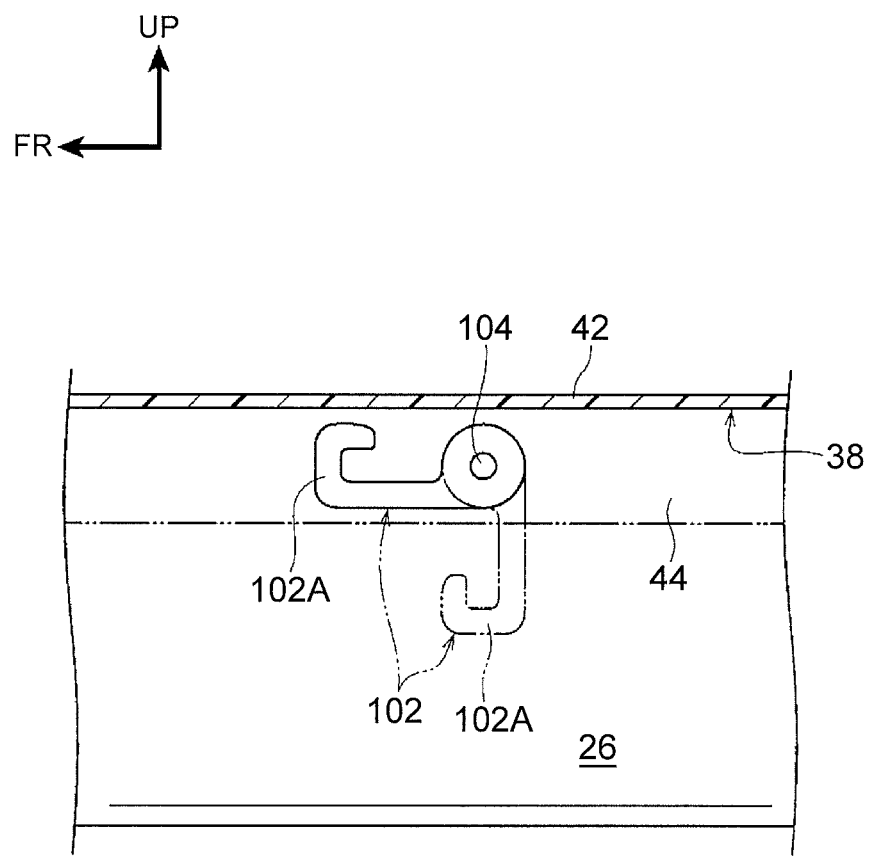
FIG. 9 is a sectional view of a modified example (3) of the vehicle ceiling structure according to the example embodiment cut along the vehicle width direction.

A hook 102 is provided to the rear of the assist grip 64 on the rear seat side, as shown in FIG. 6, but the hook 102 may also be housed in the groove 38. More specifically, the hook 102 is provided rotatable around a shaft portion 104 that is provided in the vehicle width direction inside the groove 38, as shown in FIG. 9.

The hook 102 is a well-known so-called push-type hook that releases from a locked state when a free end portion 102A side of the hook 102 is pushed upward. Accordingly, the hook 102 is urged by a torsion spring, not shown, provided around the shaft portion 104, such that a free end portion 102A of the hook 102 rotates downward around the shaft portion 104.

The far wall portion 44 of the groove 38 is along the rotation trajectory of the hook 102, so the free end portion 102A of the hook 102 will abut against this far wall portion 44 when the hook 102 is rotated approximately 90 degrees, and as a result, rotational movement of the hook 102 will be restricted. When the free end portion 102A side of the hook 102 is rotated upward around the shaft portion 104, the hook 102 will be locked in a state housed inside the groove 38. That is, the hook 102 is not exposed to the cabin space 26 side when not in use, so the cabin space 26 is able to appear spacious.

Figure 10:
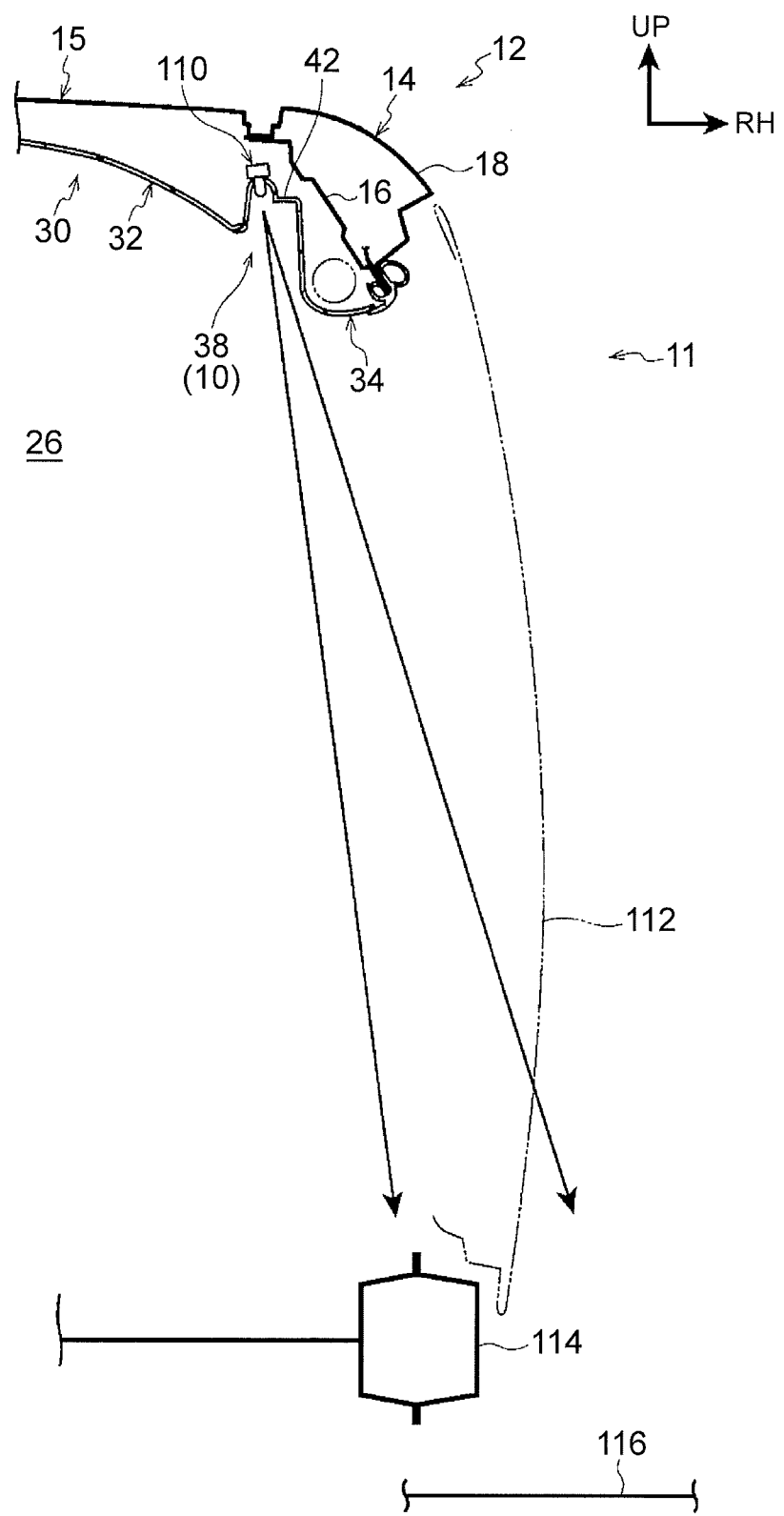
FIG. 10 is a sectional view of a modified example (4) of the vehicle ceiling structure according to the example embodiment cut along the vehicle width direction.

Also, the groove 38 may be used as lighting, as shown in FIG. 10. A light source 110 is provided on the upper wall portion 42 of the groove 38. This light source 110 is set such that a switch is turned ON and OFF with the opening and closing of a side door 112. More specifically, when the side door 112 is opened, the switch of the light source 110 turns ON, and when the side door 112 is closed, the switch of the light source 110 turns OFF. Having the switch of the light source 110 turn ON when the side door 112 is opened enables a rocker 114 and the ground 116 where the occupant will step to be illuminated.

Figure 11:
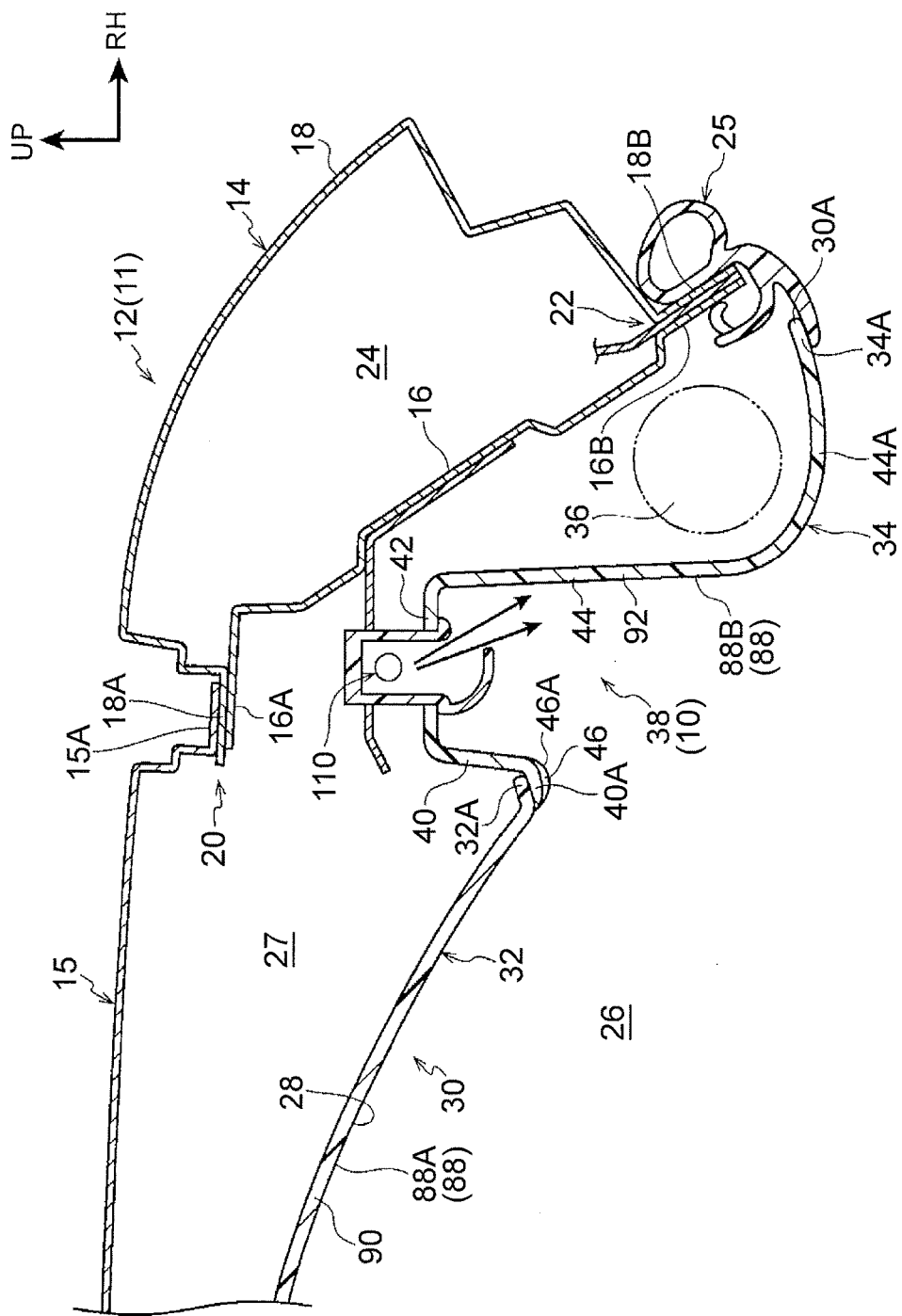
FIG. 11 is a sectional view of a modified example (5) of the vehicle ceiling structure according to the example embodiment cut along the vehicle width direction.

Aside from this, the groove 38 may also be used as indirect lighting, as shown in FIG. 11. The light source 110 in this case illuminates the far wall portion 44 of the groove 38. By illuminating the far wall portion 44 in this way, the far wall portion 44 of the groove 38 will be brighter. As a result, the terminal side of the ceiling portion 30 will be brighter, so the expanse of the space at the ceiling portion 30 is able to be displayed.

Figure 12:
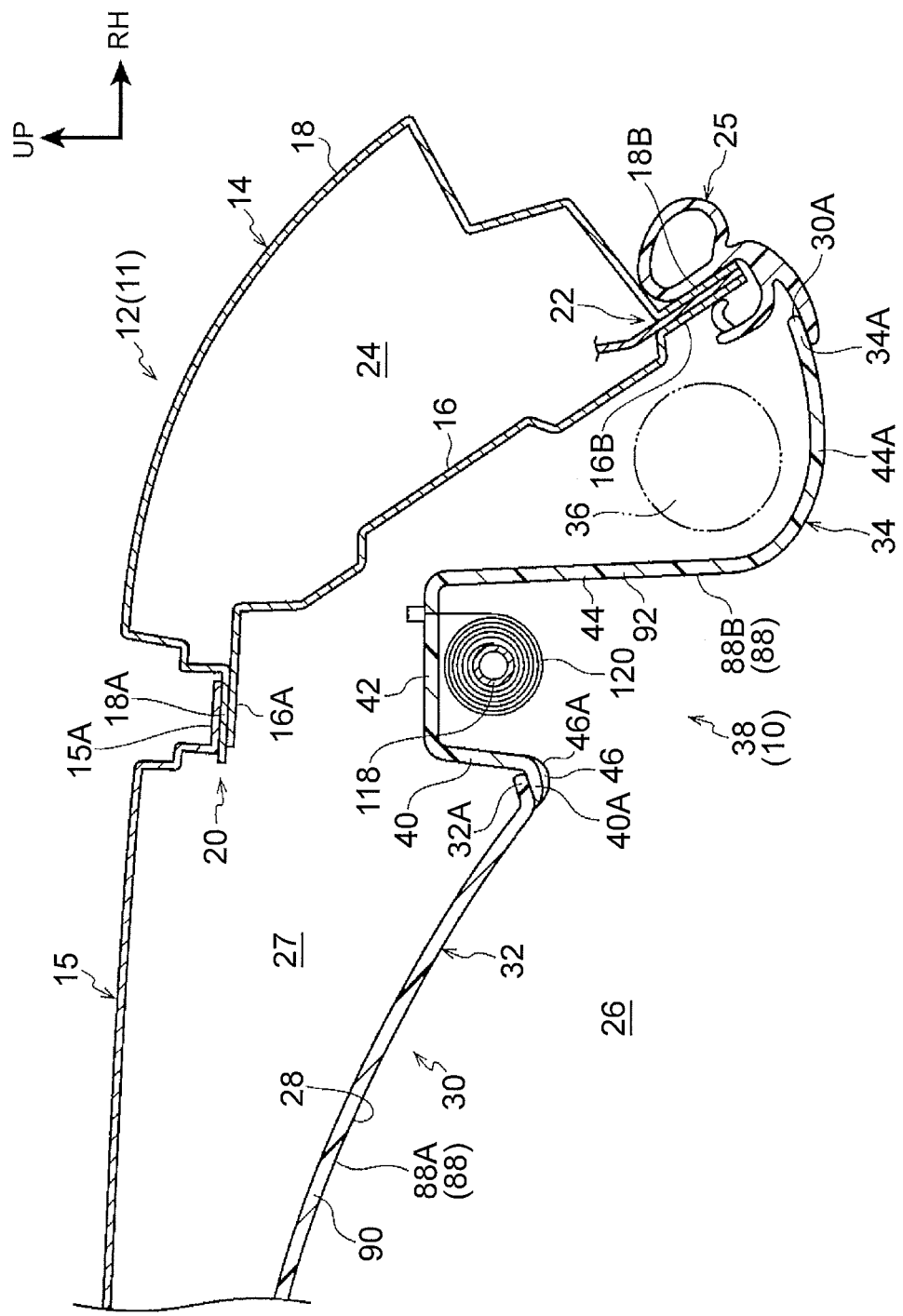
FIG. 12 is a sectional view of a modified example (6) of the vehicle ceiling structure according to the example embodiment cut along the vehicle width direction.

Furthermore, a shaft portion 118 may be provided in the extending direction of the groove 38 inside the groove 38, and a roll curtain 120 may be rolled up on this shaft portion 118 and housed inside the groove 38, as shown in FIG. 12. The roll curtain 120 is not exposed to the cabin space 26 side when not in use, so the cabin space is able to appear spacious. Also, instead of the roll curtain 120, a blind or the like may be used, and the style is not limited to roll style and may also be accordion style.

As described above, by making these parts appear at first glance as though they are not there, the ceiling portion 30 (see FIG. 6) appears neat, giving the cabin space 26 a spacious feeling.

While an example embodiment of the invention has been described, the invention is not limited to this kind of example embodiment. The example embodiment and various modified examples may be used in any appropriate combination, and the invention may be carried out in any one of a variety of modes within the scope of the invention.

What is claimed is:

1. A ceiling structure for a vehicle, comprising:
a ceiling portion that forms a ceiling surface of a cabin space of the vehicle, and is formed such that a terminal side is lower in a vehicle vertical direction than a center side; and
a groove that is provided in a vehicle longitudinal direction on at least the terminal side on an outside of the ceiling portion in a vehicle width direction, and is recessed upward in the vehicle vertical direction and outward in a horizontal direction,
wherein the groove is formed continuous from a front end portion to a rear end portion of the vehicle,
wherein the ceiling portion includes a molded ceiling and a roof side garnish that extends in the vehicle longitudinal direction on an outer side of the molded ceiling in the vehicle width direction, and
Wherein the groove is provided in the roof side garnish.

2. The ceiling structure according to claim 1, wherein
the groove includes an upper wall portion, the upper wall portion being positioned on an upper side of the groove in the vehicle vertical direction; and
the upper wall portion is provided in the cabin space of the vehicle so as to be hidden from view of a seated occupant seated on a seat.

3. The ceiling structure according to claim 1, wherein
the groove includes a far wall portion, the far wall portion being positioned on the terminal side of the ceiling portion; and
the far wall portion is provided in the cabin space of the vehicle so as to be visibly recognizable by a seated occupant seated on a seat.

4. The ceiling structure according to claim 1, wherein
a protruding portion is provided on an inside edge portion of the groove that is positioned on the center side of the ceiling portion, the protruding portion protruding downward in the vehicle vertical direction.

5. The ceiling structure according to claim 4, wherein
an apex portion of the protruding portion is arranged higher than a terminal portion of the ceiling portion in the vehicle vertical direction.

6. The ceiling structure according to claim 1, wherein
an interior member provided on the terminal side of the ceiling portion is housed inside of the groove.

7. The ceiling structure according to claim 6, wherein
the interior member is an assist grip for hooking a finger of a seated occupant seated on a seat onto.

* * * * *